L. W. CLARK.
FLY EXIT.
APPLICATION FILED OCT. 5, 1909.
954,256.
Patented Apr. 5, 1910.
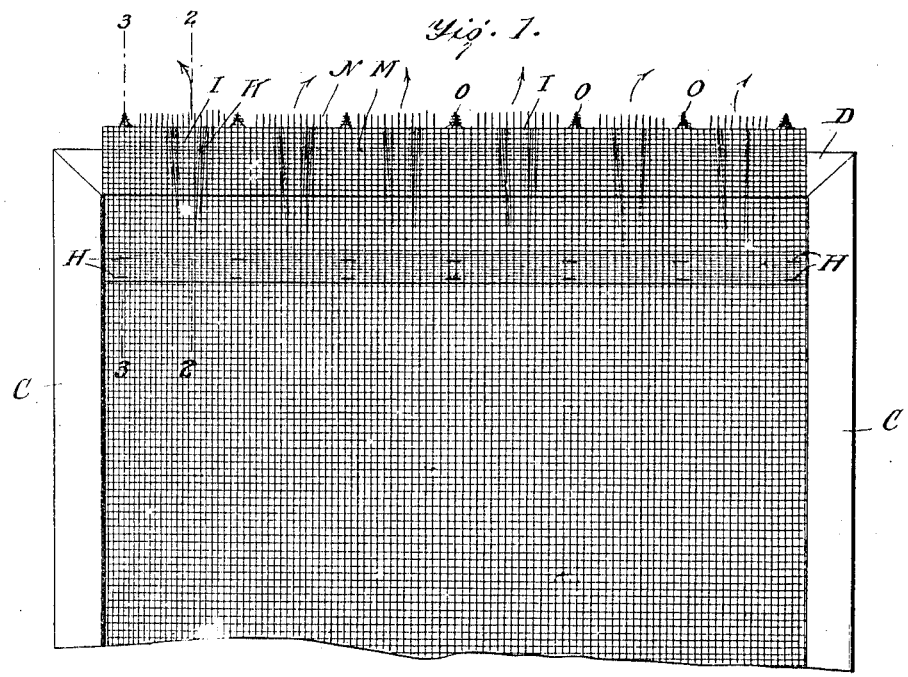
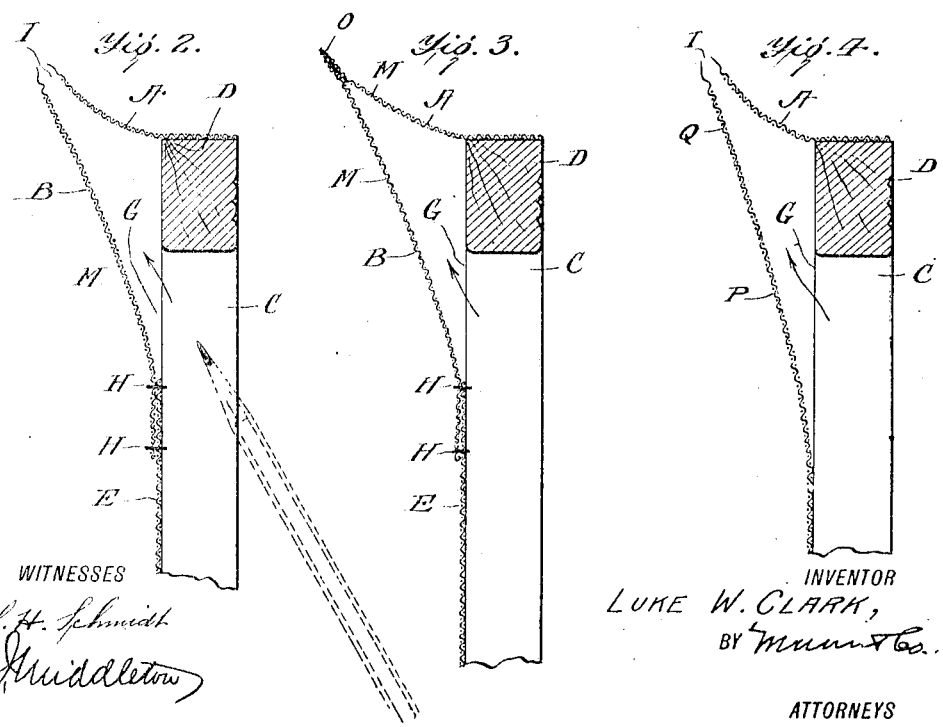
WITNESSES
INVENTOR
LUKE W. CLARK,
BY
ATTORNEYS

UNITED STATES PATENT OFFICE.

LUKE W. CLARK, OF CARTERVILLE, MISSOURI.

FLY-EXIT.

954,256.   Specification of Letters Patent.   Patented Apr. 5, 1910.

Application filed October 5, 1909. Serial No. 521,165.

*To all whom it may concern:*

Be it known that I, LUKE W. CLARK, a citizen of the United States, and a resident of Carterville, in the county of Jasper and State of Missouri, have invented certain new and useful Improvements in Fly-Exits, of which the following is a specification.

My invention is an improvement in fly exits, and consists in certain novel constructions, and combinations of parts, hereinafter described and claimed.

The object of the invention is to provide a device of low cost which may be applied to the ordinary window screen with but little cost or trouble, and which will permit flies free egress from the room or building, while at the same time effectually preventing their ingress.

Referring to the drawings forming a part hereof, Figure 1 is a front view of the improvement in place. Fig. 2 is a section on the line 2—2 of Fig. 1. Fig. 3 is a section on the line 3—3 of the same figure and Fig. 4 is a similar view of a modified form.

The embodiment of the invention shown in Figs 1, 2 and 3, comprises a pair of strips A and B, which are arranged in a manner to be presently described, at the upper end of a screen frame, of ordinary construction, and consisting of side bars C, and end bars D. The frame is covered with the usual wire screen E except, for a short distance at the top of the screen, where it is omitted to form a transverse gap G, extending preferably the full width of the screen. The strips or blades A and B are arranged across this gap, the one A being secured to the upper face of the top bar D of the screen, and the other B to the upper edge of the screen E, by means of wire staples H. which are passed through the openings of the superimposed layers and clenched. The free edges of the strips or blades A and B are in contact, and at suitable intervals, the material of the strips is bent away in opposite directions, to form a substantially cylindrical passage I between the said strips or blades, and transversely thereof. Upon each side of each of the passages I, the material of the blades is crimped as shown at K, in Figs. 1 and 3, the said crimps materially strengthening the strips. Both of the blades or strips are bent upwardly and outwardly, away from the screen frame, as shown in Figs. 2 and 3, so that the free edges thereof, are above and in front of the screen, and the ends of the strips are secured together in any suitable manner. The passages I may be formed in any suitable manner, as for instance by a lead pencil M. The strips are placed in position, with their free edges superimposed, and the pencil is pushed upwardly and outwardly, between the strips, until the point extends beyond the edges thereof. While in this position, the material of the two strips is pressed closely together and closely against the sides of the pencil, to form the crimps K, after which the pencil is withdrawn, and another formed in the same manner. Preferably the horizontal wires M of the strips are raveled out for a short distance from the free edges, having the vertical wires N extending as shown in Figs. 1 and 2, and at suitable intervals, several of the adjacent points are twisted together as indicated at O, in Figs. 1 and 3, to hold the edges of the strips in closely superimposed position.

In the embodiment shown in Fig. 4, the strip B is dispensed with, and the screen wire P is extended upwardly and outwardly as at Q, to take the place of the strip B. The construction is otherwise the same as that just described.

The last described embodiment is preferable for new screens, while the former is preferable for old screens in which the wire screen is already in place.

In the use of the device, the screens are placed in the windows in the usual manner. When a fly or other insect flies against the screen, it crawls upward toward the top, and passes out at the passages I. The gradual curve of the wire screen assists in the trapping of the insects, since there is no obstruction to their free upward movement, and no abrupt turns.

It will be evident that the improvement adds but little to the cost of the screens, and is easily constructed, requiring no special skill, and is very efficient.

The outward and upward curve of the strips is an important feature of the invention. When the insect reaches the inlet of the passage it is under the overhang of the upper strip, and the outlet through the passage is shorter than the return.

The well known tendency of flies to crawl upward on an obstruction assists in the operation of the exit, and owing to the peculiar arrangement of the strips and the passages, the passage directly in front of the fly, when it starts upward, is always open.

I claim:

1. The combination with the frame, of a covering therefor of wire gauze, the upper edge of the covering being detached from the frame and bent outwardly and upwardly away from the frame and above the same, a strip of wire gauze secured to the upper end of the frame, the free edge being superimposed on the free edge of the covering, said edges being raveled to form points, and having passages formed therebetween at suitable intervals, sundry of said points being twisted together between the passages.

2. A device of the character specified for attachment to a screen, and comprising a pair of wire gauze strips having their ends secured together and the edge of one superimposed on the corresponding edge of the other, the said edges being raveled to form outwardly projecting points, the points being twisted together at intervals, and passages being formed between said twisted portions, the material of the strips being crimped on each side of the passages.

3. A device of the character specified for attachment to a screen, and comprising a pair of wire gauze strips having their ends secured together and the edge of one superimposed on the corresponding edge of the other, the said edges being raveled to form outwardly projecting points, the points being twisted together at intervals, and passages being formed between said twisted portions.

4. The combination with the frame, of a pair of strips of perforated material having their ends secured together and the edge of one superimposed on the corresponding edge of the other, the said edges being raveled to form outwardly projecting points, the points being twisted together at intervals, and passages being formed between the twisted portions, one of said strips being attached to the face of the frame, and the free edge of the other to the top thereof.

LUKE W. CLARK.

Witnesses:
JOHN C. ELLIS,
J. W. GRUBBS.